US006185537B1

(12) United States Patent
Oh et al.

(10) Patent No.: US 6,185,537 B1
(45) Date of Patent: Feb. 6, 2001

(54) HANDS-FREE AUDIO MEMO SYSTEM AND METHOD

(75) Inventors: Stephen S. Oh, Richardson; Stephen Ira Popik, Plano, both of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/984,221

(22) Filed: Dec. 3, 1997

Related U.S. Application Data
(60) Provisional application No. 60/032,507, filed on Dec. 3, 1996.

(51) Int. Cl.[7] .................................................. G10L 15/22
(52) U.S. Cl. ............................................. 704/275; 704/272
(58) Field of Search .................................. 704/275, 270, 704/272, 200, 257, 250, 246, 256

(56) References Cited

U.S. PATENT DOCUMENTS

| 4,348,550 | * | 9/1982 | Pirz et al. ............................. 379/357 |
| 4,426,733 | * | 1/1984 | Brenig ..................................... 455/79 |
| 4,520,576 | * | 6/1985 | Molen ..................................... 34/534 |
| 4,737,976 | * | 4/1988 | Borth et al. ........................... 455/563 |
| 4,737,979 | * | 4/1988 | Hashimoto ............................. 379/82 |
| 5,014,317 | * | 5/1991 | Kita et al. ............................ 395/2.83 |
| 5,420,912 | * | 5/1995 | Kopp et al. .......................... 455/563 |
| 5,477,511 | * | 12/1995 | Engelhardt ............................. 369/25 |
| 5,481,645 | * | 1/1996 | Bertino et al. ....................... 395/2.79 |
| 5,491,774 | * | 2/1996 | Norris et al. ........................ 395/2.79 |
| 5,526,407 | * | 6/1996 | Russell et al. ......................... 379/89 |
| 5,602,963 | * | 2/1997 | Bissonnette et al. ............... 395/2.84 |
| 5,657,380 | * | 8/1997 | Mozer ..................................... 379/88 |
| 5,684,506 | * | 11/1997 | Taylor et al. ......................... 345/133 |
| 5,794,205 | * | 8/1998 | Walters et al. ....................... 704/275 |
| 5,812,977 | * | 9/1998 | Douglas ............................... 704/275 |
| 5,878,395 | * | 3/1999 | Bennett ............................... 704/275 |
| 5,999,908 | * | 12/1999 | Abelow ..................................... 705/1 |

* cited by examiner

Primary Examiner—Richemond Dorvil
(74) Attorney, Agent, or Firm—Robert D. Marshall, Jr.; W. James Brady, III; Frederick J. Telecky, Jr.

(57) ABSTRACT

This invention (10, 50) uses an interface (12, 52) to receive a voice input from a user, and a speech recognition unit (18, 54) coupled to the interface (12, 52) to monitor the voice input and recognize a predetermined set of voice commands from the voice input. The speech recognition unit (18, 54) generates a command signal that corresponds to the recognized voice command, which is received by a controller unit (20, 58). The controller unit (20, 58) activates a speech acquisition unit (16, 56) coupled to the controller unit (20, 58) to collect and stop collecting the voice input in response to a control signal generated by the controller unit (20, 58). a memory (24, 56) is provided to store the collected voice input.

7 Claims, 5 Drawing Sheets

HANDS-FREE AUDIO MEMO SYSTEM AND METHOD

This applications claims benefit to U.S. provisional application Ser. No. 60/032,507 filed Dec. 3, 1996.

TECHNICAL FIELD OF THE INVENTION

This invention is related in general to the field of personal electronic systems. More particularly, the invention is related to a hands-free audio memo system and method for making the same.

BACKGROUND OF THE INVENTION

It is common knowledge that we are currently living in the Information Age. Data come to us in visual, audio, and written forms through a myriad of channels: radio, telecommunications, television, internet, world wide web, and just plain seeing, hearing, and feeling things as events occur around us. There are many instances when it is desirable to retain some of the information in a more reliable manner than the ability or inability to recall data we are born with, for example, that telephone number announced on the radio, the location of that specialty store, or that ingenious idea about a novel gadget to solve a stubborn problem.

The old standby to record data is the pen and paper. However, there are times when it is inconvenient to write, such as when one is operating an automobile, or when pen and paper are not accessible.

Dictaphones, which use audio tape cassettes, and some newer digital recorders, have been used to fill this void. However, they all require the use of at least one hand to hold the device, and to operate the many buttons on the device to turn on the device, record, retrieve, erase, and turn off the device. Further, because it has been shown that the use of one hand to handle a wireless telephone while operating an automobile can lead to unsafe driving and possibly higher incidents of traffic accidents, it is less than desirable to also require the driver to devote the use of one hand to operate the recording device.

SUMMARY OF THE INVENTION

Accordingly, there is a need for an audio memo system and method therefor which enable hands-free operations.

In accordance with the present invention, a hands-free audio memo system and method are provided which eliminate or substantially reduce the disadvantages associated with prior devices.

In one aspect of the invention, an hands-free audio memo system and method uses an interface to receive a voice input from a user, and a speech recognition unit coupled to the interface to monitor the voice input and recognize a predetermined set of voice commands from the voice input. The speech recognition unit generates a command signal that corresponds to the recognized voice command, which is received by a controller unit. The controller unit activates a speech acquisition unit coupled to the controller unit to collect and stop collecting the voice input in response to a control signal generated by the controller unit. A memory is provided to store the collected voice input.

In another aspect of the invention, an hands-free personal memo system includes an analog interface receiving a voice input from a user, a speech recognition unit coupled to the interface adapted for receiving the voice input therefrom, recognize a predetermined set of voice commands from the voice input, and generating a command signal in response thereto. A controller unit is coupled to the speech recognition unit which generates a control signal in response to receiving the command signal from the speech recognition unit. A digital telephone answering device is coupled to the controller unit and analog interface for collecting and storing the voice input.

In yet another aspect of the invention, a method for hands-free audio memo includes the steps of receiving a voice input from a user, recognizing a voice commands in the voice input indicative of the user's desire to record an audio memo, collecting subsequent voice input, and storing the subsequent voice input.

Hands-free audio memo system and method therefor of the present invention provide a way for users to record audio memos and perform other functions without the use of a hand for its operation. This is especially advantageous for persons who are operating an automobile or performing other tasks that require concentration and generally the use of both hands.

BRIEF DESCRIPTION OF THE DRAWINGS

For a better understanding of the present invention, reference may be made to the accompanying drawings, in which.

DETAILED DESCRIPTION OF THE INVENTION

Figure 1:
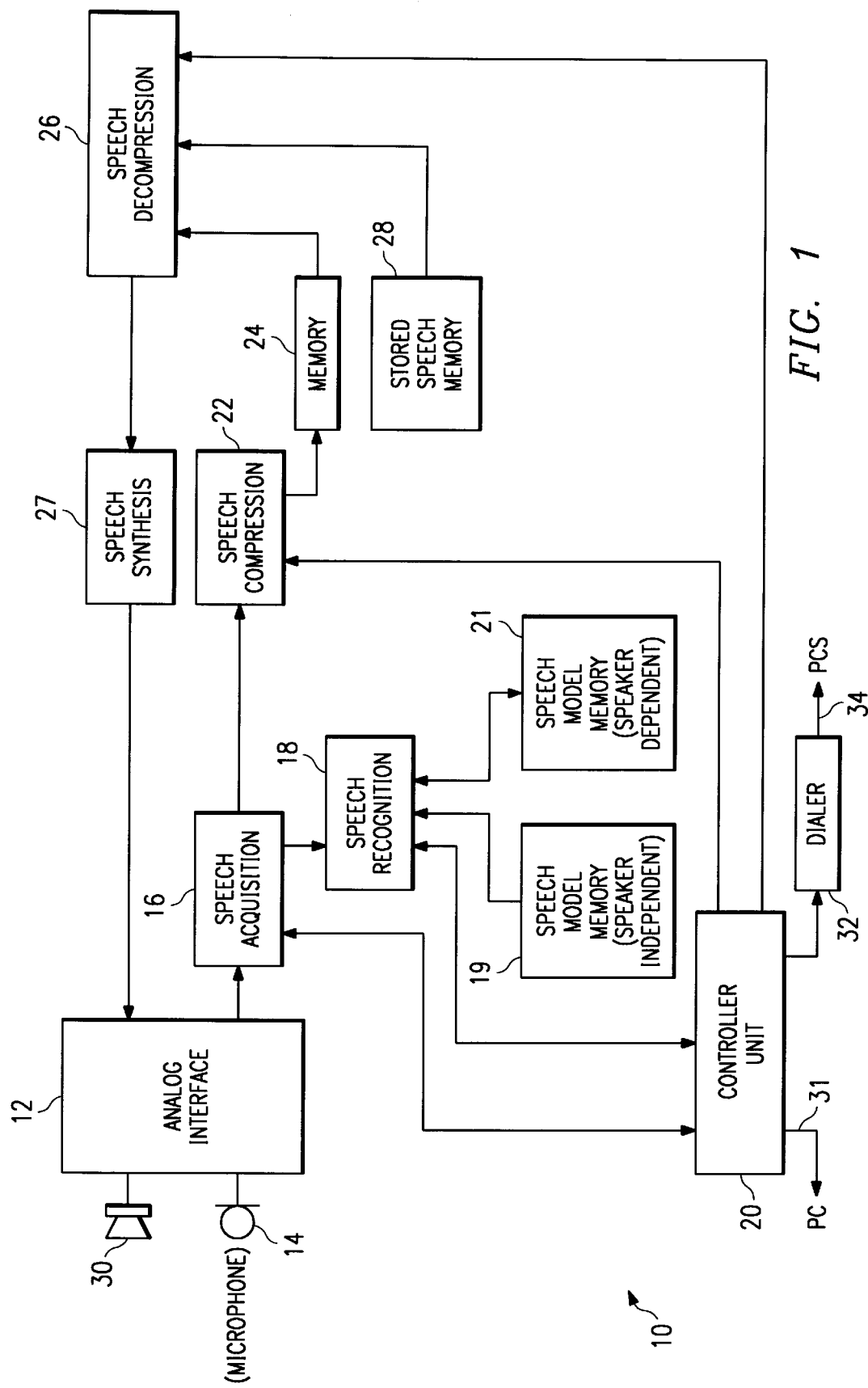
FIG. 1 is a simplified functional block diagram of an exemplary hands-free audio memo system constructed according to the teachings of the present invention.

The preferred embodiment(s) of the present invention is (are) illustrated in FIGS. 1–6, like reference numerals being used to refer to like and corresponding parts of the various drawings.

Referring to FIG. 1, a functional block diagram of an exemplary hands-free audio memo system 10 constructed according to the teachings of the present invention is shown. System 10 includes an analog interface 12 which receives voice input of a user captured by a microphone 14, and converts the analog voice input into a digital voice input signal. Analog interface 12 is further coupled to a speech acquisition unit 16, which functions to collect the digital voice input signal. The collected digital voice input signal is then provided to a speech recognition unit 18, which receives the digital voice input signal and searches for a set of predetermined voice commands and responses stored in a speaker-independent speech model memory 19 and/or an optional speaker-dependent speech model memory 21. For example, the voice command may be "MEMO START" or "TAKE MEMO" to initiate memo recording, "MEMO TERMINATE" to stop memo recording, and other appropriate responses. Further, certain commands and responses may be only valid during certain times and ignored at other times. For example, when memo recording is taking place, speech recognition unit 16 may only listen for a smaller set of commands and/or responses from the user, such as "MEMO TERMINATE," and not "YES" or "NO."

Speech recognition unit 18 is further coupled to a controller unit or microcontroller unit (MCU) 20. When speech recognition unit 16 recognizes a valid command or response, it generates a signal to inform controller unit 20 to take appropriate actions. Controller unit 20 is further coupled to a speech compression unit 22, which is also coupled to speech acquisition unit 16. Speech compression unit 22 compresses the digital voice input signals collected by speech acquisition unit 16 using known compression algorithms and stores the compressed signals into a memory 24.

A speech decompression unit 26 and a speech synthesis unit 27 are further coupled between controller unit 20 and analog interface 12. Controller unit 20 instructs speech compression unit 26 to decompress stored speech in memory 28 and provide to speech synthesis unit 27 to produce a speech prompt or response at appropriate times, which is then broadcast to the user by a speaker 30 coupled to analog interface 12.

Optionally, a communications link 31 may be provided to download voice input signals stored in memory 24 to a personal computer (not shown). In addition, a dialer 32 and link 34 may be further provided to a personal communications system (not shown) to perform functions related to telecommunications, such as dialing a particular number or "CALL HOME."

Figure 2:
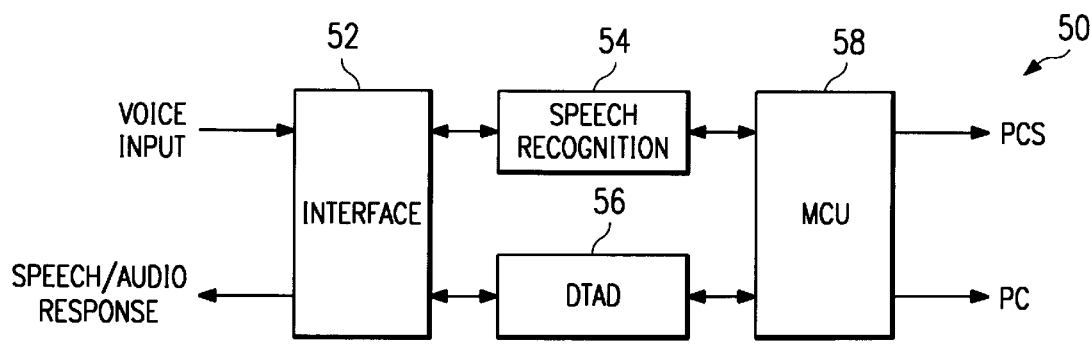
FIG. 2 is a simplified block diagram of an alternative embodiment of the hands-free audio memo system of the present invention.

FIG. 2 is a simplified block diagram of an embodiment of hands-free audio memo system 50 according to the teachings of the present invention. System 50 includes an analog interface 52 coupled to a speech recognition unit 54 and a digital telephone answering device (DTAD) 56. DTAD 56 typically includes speech acquisition and compression functions, and a memory. a microcontroller unit 58 is further coupled to speech recognition unit 54 and DTAD 56.

System 50 may be implemented with commercially available components or devices. For example, interface 52 may be implemented with TCM320AC36 or TCM320AC37 Voice-Band Audio Processors (VBAP)™ manufactured by Texas Instruments Incorporated of Dallas, Tex.; speech recognition unit 54 may be implemented with TMS320C5X Digital Signal Processor (DSP) also manufactured by Texas Instruments Incorporated; DTAD 56 may be implemented with the MSP58C8X product line of Texas Instruments Incorporated; and microcontroller unit 58 may be implemented with TMS370 family products of Texas Instruments Incorporated.

A single chip implementation is also contemplated by the present invention. For example, components in Texas Instrument's cDSP™ product line may be incorporated and formed on a single silicon substrate to construct an integrated circuit. For example, a C54X core for performing the speech recognition and DTAD functions, an Advanced RISC (reduced instruction set computing) Machines (ARM™) 7TDMI core for performing the controller unit functions, and a Voice-Band Audio Processor core for performing analog interface functions may be combined into a single integrated circuit. It may be seen that the above are merely examples and other suitable substitutes may be used.

Figure 3:
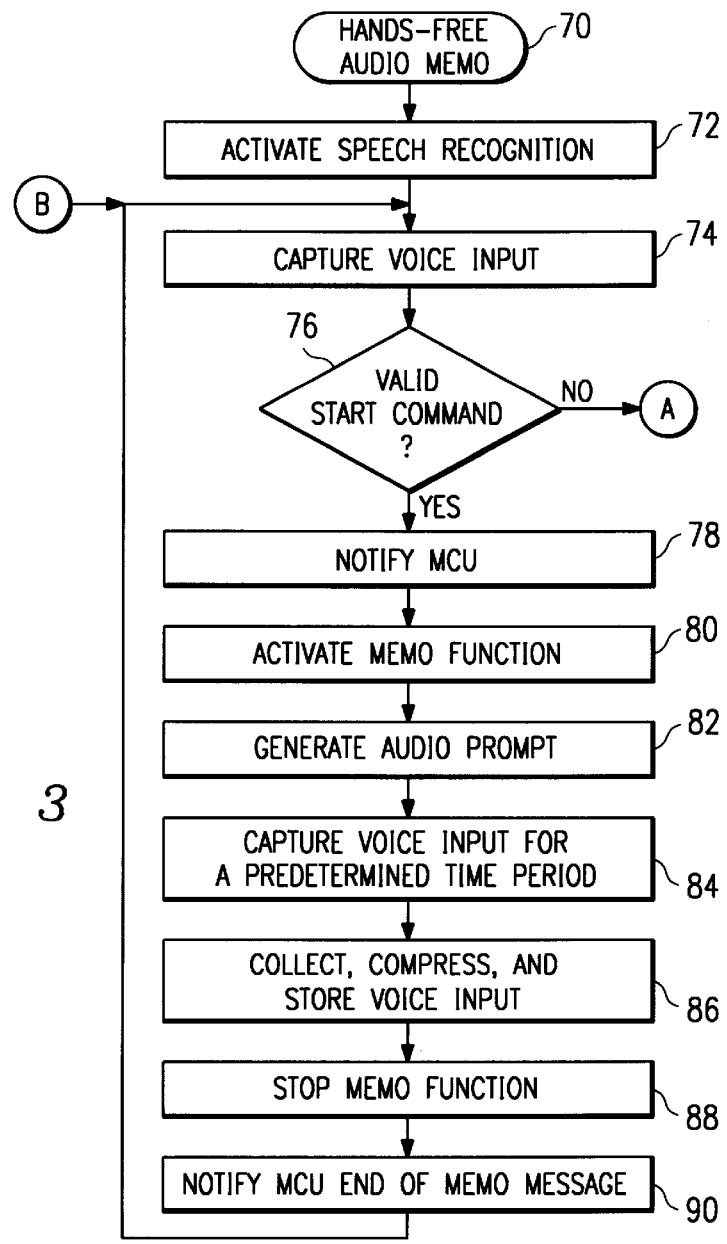
FIG. 3 is an exemplary flowchart of a simplified hands-free audio memo algorithm according to the teachings of the present invention.

Referring to FIG. 3 as well as the block diagrams in FIGS. 1 and 2, an exemplary process flow 70 for hands-free audio memo systems 10 and 50 is provided. Speech acquisition 16 or DTAD 56 and recognition 16 or 54 is first activated in step 72. The activation may be done at the time the automobile (not shown) is started, by the push of a button, or by leaving the key in the accessory position, for example. In steps 72 and 74, speech recognition unit 18 or 54 searches for a valid command appropriate for the occasion, such as "MEMO START" to start the memo recording process. Once a valid command is recognized, as determined in step 76, controller unit 20 or 58 is notified, such as by a signal generated by speech recognition unit 18 or 54, as shown in step 78. Controller unit 20 or 58 then activates the memo function, as shown in step 80. Once the system is ready, an optional audio prompt or speech (e.g., "MEMO SYSTEM READY") may be generated in step 82 to signal to the user that he/she may begin to speak. A timer or counter (not shown) set for a predetermined time period may be started when speech acquisition 16 begins to capture voice input in step 84. The collected voice input is converted to digital signals, compressed and stored in memory 24, as shown in step 86. When the timer expires, speech acquisition is stopped, as shown in step 88. Controller unit 20 or 58 is then notified that memo recording terminated, as shown in step 90, and execution returns to step 74 to be ready for the next memo.

Figure 4:
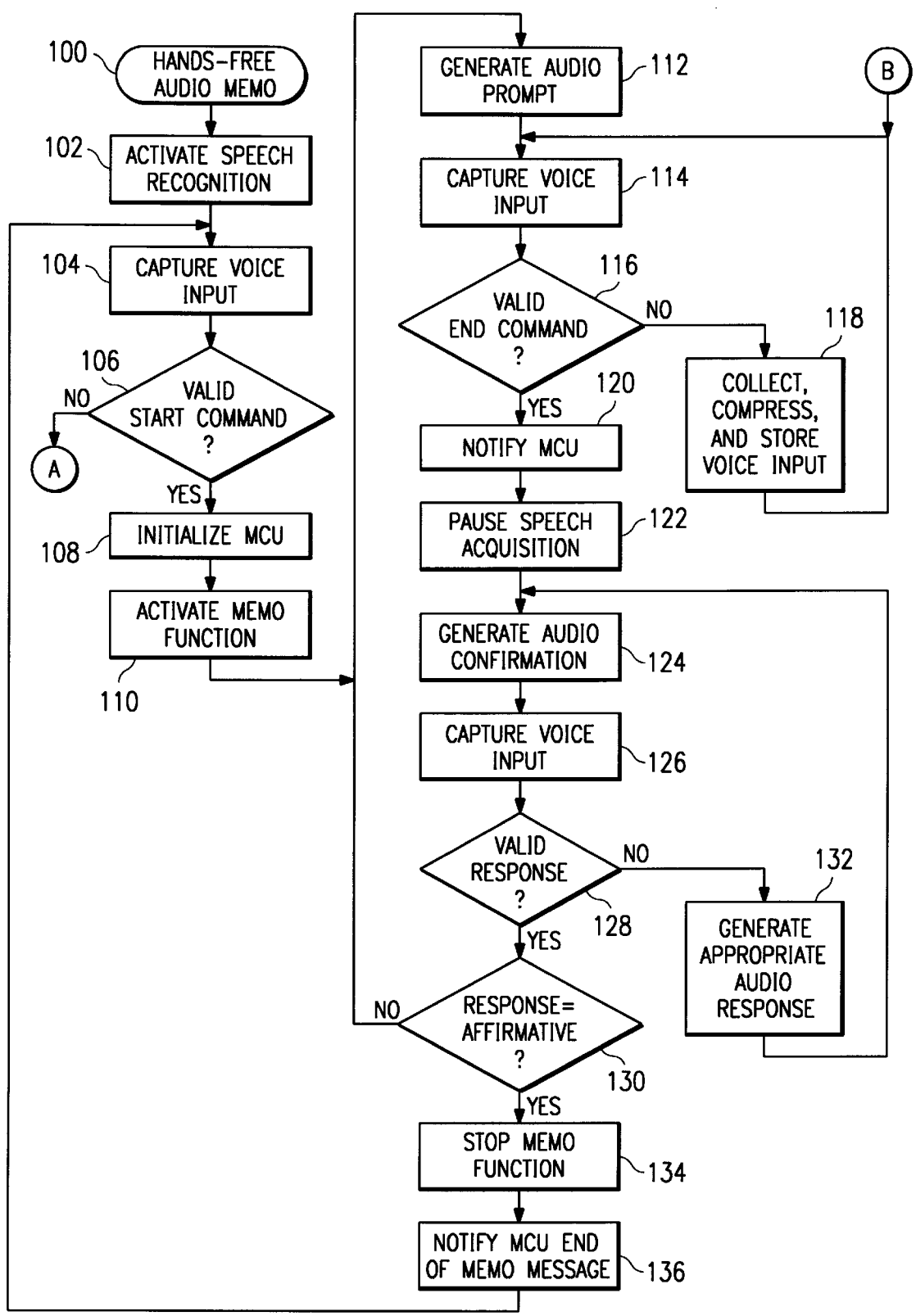
FIG. 4 is an exemplary flowchart of an hands-free audio memo algorithm according to the teachings of the present invention.

A second version of the method for hands-free audio memo 100 is shown in FIG. 4. Speech acquisition 16 or DTAD 56 and speech recognition 18 or 54 are activated either by starting the automobile, leaving the key in the accessory position, or the push of a button (not shown), for example, as shown in step 102. Speech recognition 18 or 54 monitors the speech uttered by the user(s) in the vicinity and searches for recognizable valid voice commands and/or responses, such as a command to start the memo process, as shown in step 104.

When it is determined that the captured voice input is a valid command, such as "MEMO START," controller unit 20 or 58 is notified, as shown in steps 106 and 108. Controller unit 20 or 58 in turn activates the memo function, as shown in step 110. In step 112, an audio prompt or speech (e.g., "MEMO SYSTEM READY") may be generated to signal to the user that he/she may begin to speak. The user's speech is then captured and compared with recognizable commands appropriate for the circumstances, such as "MEMO TERMINATE" to end the process, as shown in steps 114 and 116. Speech recognition 18 or 54 may be running in a low resource mode at this time to look for only those commands that are valid during this time, such as only the command to terminate or pause the memo taking process. If the captured utterance is not a recognizable and valid command, then it is collected, compressed, and stored, as shown in step 118. If in step 116, it is determined that the captured speech is a recognizable and valid command to end the memo process, for example, then controller unit 20 or 58 is notified, as shown in block 120. Controller unit 20 or 58 then pauses speech acquisition, as shown in step 122, and instructs speech decompression 26 and speech synthesis 27 to issue an audible prompt for confirmation, such as "READY TO TERMINATE MEMO?" The subsequent voice input is then captured and monitored for a valid response to the prompt, such as "YES" or "NO," as shown in steps 126 and 128. If the received voice input is not a recognizable valid response to the confirmation, then an appropriate audio response may be generated to reconfirm, as shown in step 132. If the voice input is recognized as a response indicative that the user is not ready to terminate the memo process, then execution returns to step 112, to continue to record memo. If on the other hand the voice input is recognized as an affirmative response in step 130, then the memo function is stopped in step 134, and controller unit 20 or 58 is notified in step 136. Execution then returns to step 104 to prepare for the next memo.

Figure 5:
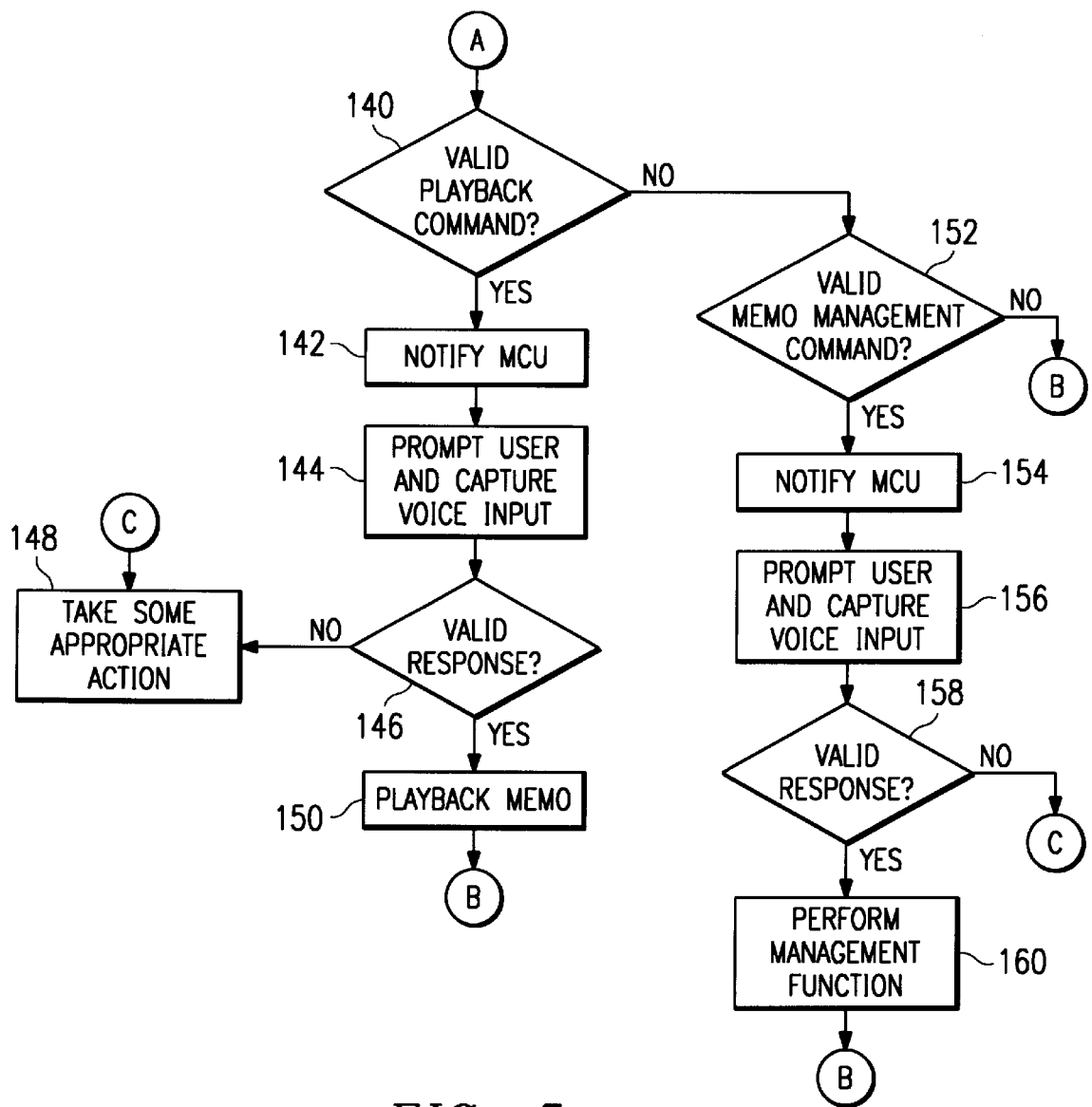
FIG. 5 is an exemplary flowchart of voice playback and memo management functions of the hands-free audio memo algorithm according to the teachings of the present invention.

FIG. 5 is a flowchart of memo playback and memo management functions of system 10 and 50. At step 76 shown in FIG. 3 or step 106 shown in FIG. 4, if the voice input is not a valid start command, it is also checked for whether it is a valid playback command, as shown in step 140. If it is, controller unit 58 is notified in step 142 and the user is prompted for additional input, which is captured, as shown in step 144. The captured speech input is then examined to determined whether it is a valid response to the prompt given in step 144, if not, some appropriate action is taken in step 148, such as issue an appropriate audio statement. If it is a valid response, then the memo playback function 150 is launched, where the user may play back one or more previously recorded memos, skip one or more memos, etc. At the end of the memo playback function, the algorithm may return to step 74 in FIG. 3 or step 114 shown in FIG. 4.

If in step 140 it is determined that the speech input is not a valid playback command, then a determination is made as to whether it is a valid memo management command in step 152. If not, then the process may return to step 74 in FIG. 3 or step 114 shown in FIG. 4 to continue to capture the speech input. Otherwise, controller unit 58 is notified in step 154 and the user is prompted for additional input, which is captured, as shown in step 156. The captured speech input is then examined to determined whether it is a valid response to the prompt given in step 158, if not, some appropriate action is taken in step 148, such as issue an audio statement. If it is a valid response, then the memo management function 160 is launched, where the user may perform operations such as delete, save, and protect on previously recorded memos. At the end of the memo management function, the algorithm may return to step 74 in FIG. 3 or step 114 shown in FIG. 4.

Figure 6:
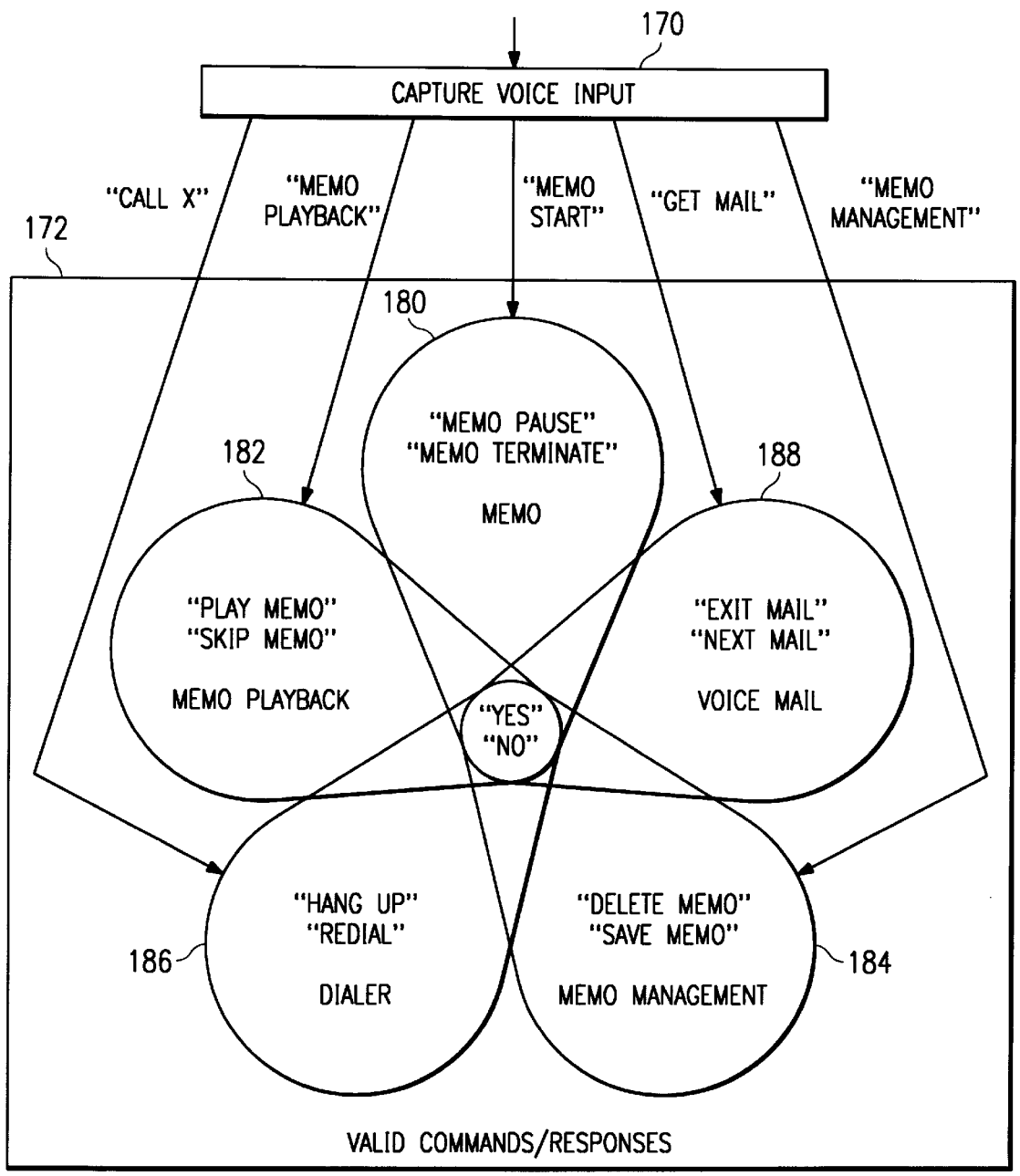
FIG. 6 is an exemplary flowchart showing exemplary voice inputs to the system according to the teachings of the present invention.

Referring to FIG. 6, a more detailed process flow is shown. As voice input is captured in step 170, it is determined whether it matched any recognizable and valid command and response in step 172. For example, one or more recognized key phrases may be used to initiate system 50 in a memo recording mode 180, memo playback mode 182, memo management mode 184, dialer mode 186, and voice mail mode 188, where each mode is shown with exemplary valid phrases recognized when system 50 is in the respective modes. The key phrases to launch each mode may include "MEMO START" to launch the memo recording functions; "MEMO PLAYBACK" to launch the memo playback functions; "MEMO MANAGEMENT" to launch the memo management functions; "CALL X" to launch the dialer functions; and "GET MAIL" to launch the voice mail functions. Thus, speech recognition unit 54 need only to focus on a subset of possible valid utterances as to speed up search and processing time and to conserve resources.

Although the present invention and its advantages have been described in detail, it should be understood that various changes, substitutions and alterations can be made therein without departing from the spirit and scope of the invention as defined by the appended claims.

What is claimed is:

1. A method for hands-free audio memo, comprising the steps of:
   receiving a voice input from a user;
   recognizing a memo start voice command in the voice input indicative of the user's desire to record an audio memo;
   collecting subsequent voice input;
   storing the subsequent voice input;
   recognizing a memo management voice command in the voice input indicative of the user's desire to manage stored voice input; and
   performing management functions in response to further voice input.

2. The method, as set forth in claim 1, wherein:
   said memo management voice command includes a delete memo voice command; and
   said method further comprises deleting a current memo in response to a delete memo voice command.

3. The method, as set forth in claim 1, wherein:
   said memo management voice command includes a save memo voice command; and
   said method further comprises saving a current memo in response to a save memo voice command.

4. The method, as set forth in claim 1, wherein:
   said memo management voice command includes a protect memo voice command; and
   said method further comprises protecting a current memo in response to a protect memo voice command.

5. A method for hands-free audio memo, comprising the steps of:
   receiving a voice input from a user;
   recognizing a memo start voice command in the voice input indicative of the user's desire to record an audio memo;
   collecting subsequent voice input;
   storing the subsequent voice input;
   storing a speech model of digital voice signal inputs corresponding to each of a plurality of voice commands;
   recognizing a voice command in the voice input indicative of a specific function by determining if said voice input matches any speech model corresponding to one of said specific functions; and
   following recognition of a voice command indicative of a specific function recognizing subsequent voice commands by attempting to match subsequent voice input to a subset of speech models of digital voice signals corresponding to valid commands following said specific function.

6. The method, as set forth in claim 5, wherein:
   said step of recognizing a voice command in the voice input indicative of a specific function includes attempting to match voice input to a first subset of said speech models.

7. The method as set forth in claim 6, wherein:
   said first subset of said speech models includes a speech model for each of the voice commands "CALL X", "MEMO PLAYBACK", "MEMO START", "GET MAIL" AND "MEMO MANAGEMENT";
   said subset of speech models corresponding to "CALL X" includes the voice commands "HANG UP", "REDIAL", "YES" and "NO";
   said subset of speech models corresponding to "MEMO PLAYBACK" includes the voice commands "PLAY MEMO", "SKIP MEMO", "YES" and "NO";
   said subset of speech models corresponding to "MEMO START" includes the voice commands "MEMO PAUSE", "MEMO TERMINATE", "YES" and "NO";
   said subset of speech models corresponding to "GET MAIL" includes the voice commands "EXIT MAIL", "NEXT MAIL", "YES" and "NO"; and
   said subset of speech models corresponding to "MEMO MANAGEMENT" includes the voice commands "DELETE MEMO", "SAVE MEMO", "YES" and "NO".

* * * * *